Figure 1:
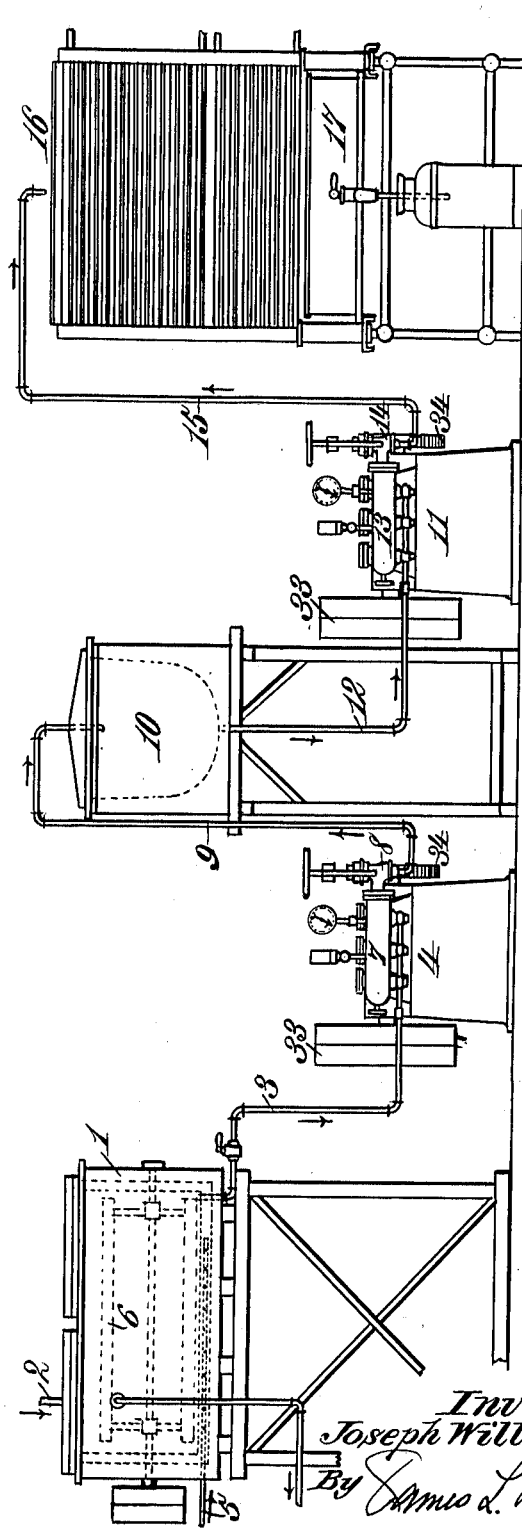

J. WILLMANN.
PROCESS OF HOMOGENIZING CREAM.
APPLICATION FILED AUG. 19, 1910.
1,004,515.
Patented Sept. 26, 1911.
3 SHEETS—SHEET 3.
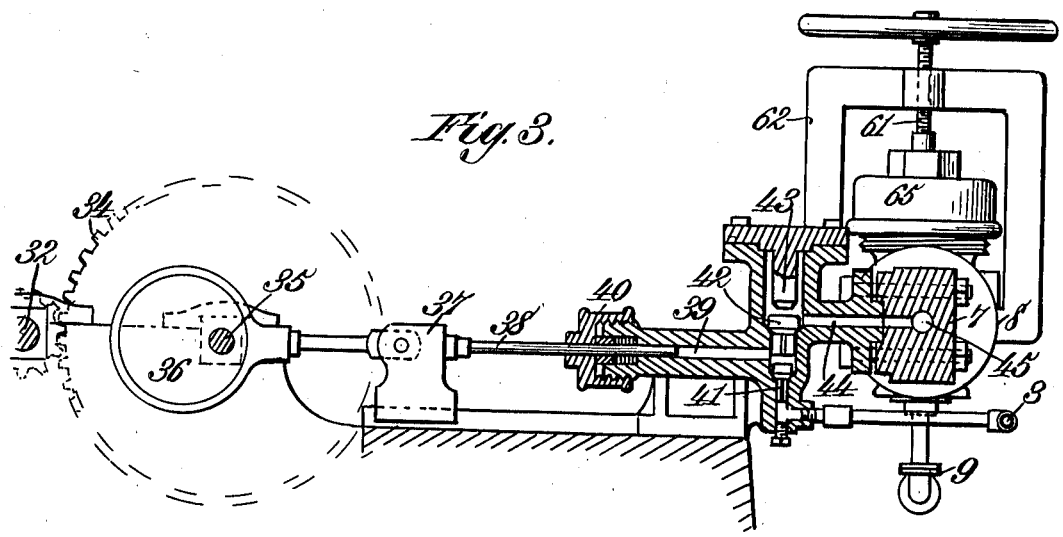
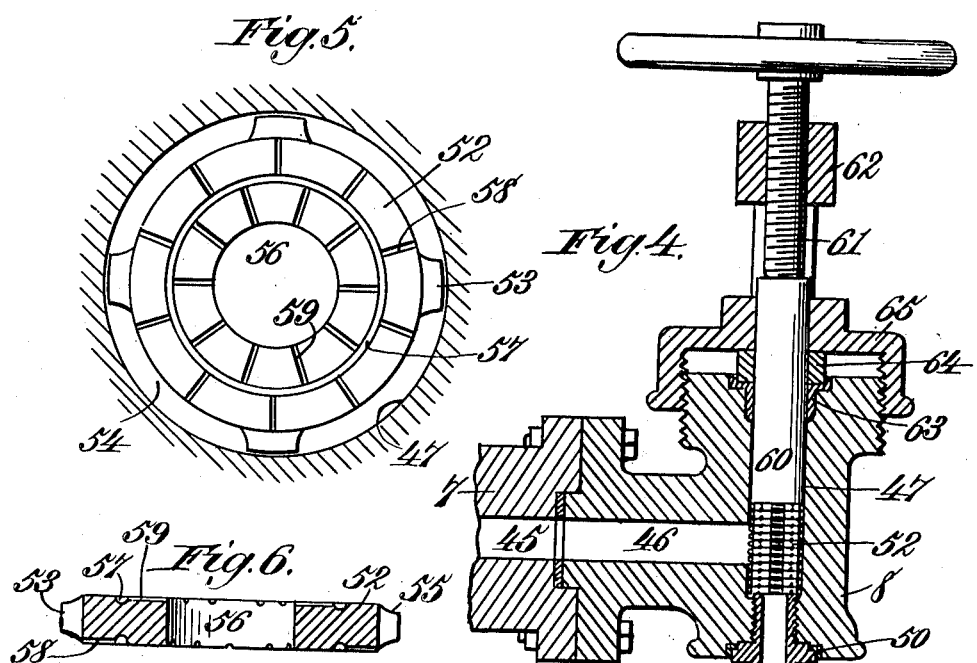
Witnesses.
Inventor:
Joseph Willman.
By Annie L. Norris
Atty.

UNITED STATES PATENT OFFICE.

JOSEPH WILLMANN, OF DERBY, CONNECTICUT.

PROCESS OF HOMOGENIZING CREAM.

1,004,515.  Specification of Letters Patent.  Patented Sept. 26, 1911.

Application filed August 19, 1910. Serial No. 578,000.

*To all whom it may concern:*

Be it known that I, JOSEPH WILLMANN, at present a subject of the Emperor of Germany, having announced my intention of becoming a citizen of the United States, residing at Derby, in the county of New Haven and State of Connecticut, have invented certain new and useful Improvements in Processes of Homogenizing Cream, of which the following is a specification.

My present invention relates to improvements in the art of homogenizing cream, and it provides an improved process of homogenizing such liquids whereby the occurrence of curd in the homogenized product is prevented, cream homogenized in accordance with the present invention having a better flavor and being heavier in appearance than raw or ordinary pasteurized cream, it is more easily digested, and it will not curdle when used in coffee, the latter being an objection to cream when homogenized by all processes heretofore known.

The homogenizing of cream as heretofore practiced consists in subjecting the cream to a pressure of substantially 250 atmospheres to the square inch and causing the cream at this very high pressure to be divided into a large number of minute streams which flow at high velocity and in the better type of homogenizing machines, the fat globules in the cream are broken up by impact of these minute streams either upon one another, upon an impact surface, or by a combination of such actions. An example of a homogenizing machine is disclosed in my prior Patent, No. 973,328 granted October 18, 1910. It is found that if cream is first pasteurized, then immediately cooled to a temperature between 85° and 115° F. and is homogenized at such a temperature, the cream becomes much heavier in appearance, and it has also been found that the temperature must be lowered proportionate to the decrease in the amount of butter fat contained in the cream, that is to say, in homogenizing a light cream, a lower temperature must be used than in homogenizing a heavy cream in order that the homogenized product may have a heavy appearance. If such cream is put into hot coffee or tea it will curdle and for such reasons cream homogenized according to known processes is sometimes unsalable owing to this objectionable feature. The apparent reason for the curdling of the cream is that the very high homogenizing pressure causes the lactic acid in the cream to precipitate casein. I have discovered that when homogenized cream is subjected a second time to the homogenizing action, the small particles of precipitated casein are all broken up and thoroughly emulsified with the balance of the solids and water of the cream. Or, in other words, by subjecting cream repeatedly to a homogenizing action, the occurrence of curd in the product is avoided.

My present process is applicable to all known processes or machines for homogenizing cream. To assist in an understanding of my process, I have illustrated certain forms of homogenizing apparatus which are capable of carrying my process into practice. It will be understood, however, that the process is not limited to any particular form of apparatus.

Figure 2:
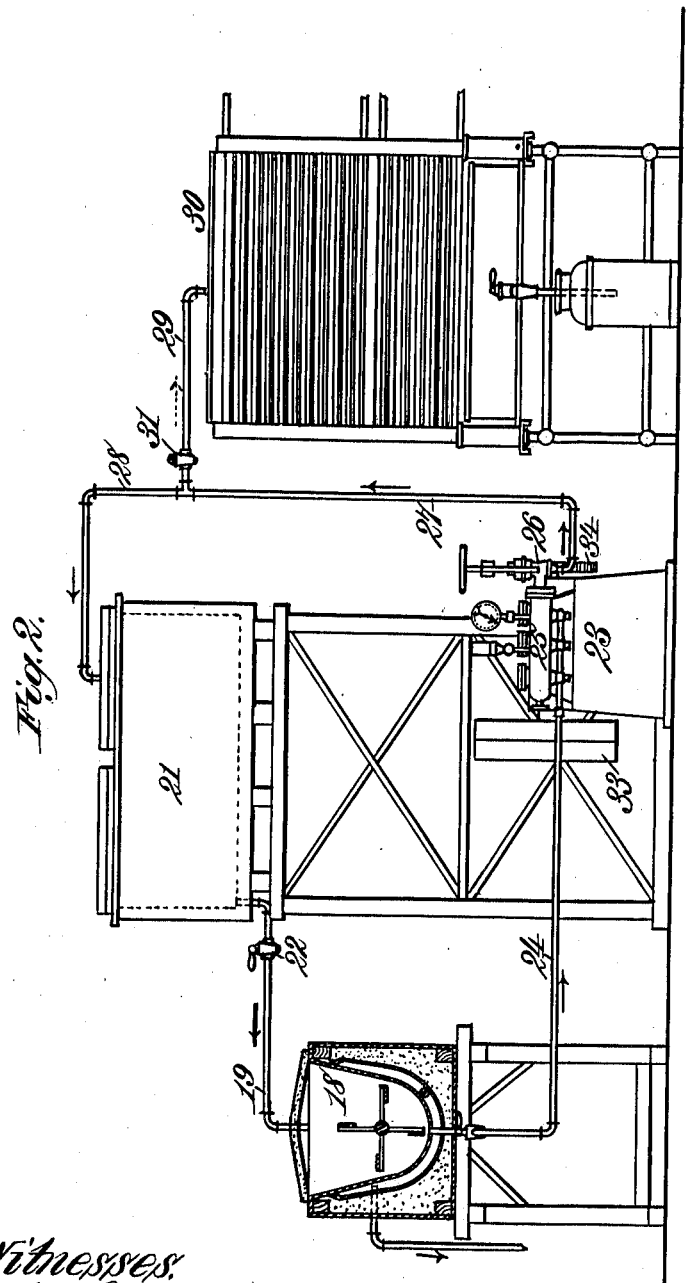

In the accompanying drawing: Figure 1 is a diagrammatic view of homogenizing apparatus wherein the cream to be homogenized is passed successively through two homogenizing machines so that it is repeatedly subjected to the homogenizing action; Fig. 2 is a diagrammatic view showing another form of apparatus which enables my present process to be carried out with a single homogenizing machine; Fig. 3 represents a detail longitudinal section through one of the pumps and the connected mechanism of the homogenizing machine; Fig. 4 represents a section through the homogenizing device; and Figs. 5 and 6 are detail views of one of the disks forming part of the homogenizing device.

Similar parts are designated by the same reference characters in the several views.

In Fig. 1, 1 designates a tank having a pipe 2 for introducing the cream to be homogenized thereto and having a pipe 3 which leads from this tank to the first homogenizing machine 4. The tank 1 may be of any suitable construction, that shown being provided with a pipe 5 through which a heating medium may be introduced into a jacket of the tank in order to raise the temperature of the cream to the desired point before it enters the first homogenizing machine, and this tank is also provided with an agitator 6 for insuring uniform temperature and condition of the cream before entering the first homogenizing machine. The cream from the tank 1 passes into the pumps of the first homogenizing machine 4 and from these pumps the cream is forced at a pressure of about 250 atmospheres to the square inch into a reservoir 7 and from the latter the cream at this high pressure is subjected to a homogenizing action by the homogenizing device 8 which is connected to the reservoir 7. A pipe 9 leads from the discharge of the homogenizing device 8 and serves to convey the cream as homogenized in the first machine into a second tank 10, this tank serving as a feed tank for the second homogenizing machine 11. The cream is conducted from the tank 10 by the pipe 12 to the pumps of the second homogenizing machine 11 and from the latter the cream is forced into the reservoir 13 at preferably the same homogenizing pressure of about 250 atmospheres. From this reservoir, the cream is forced into the homogenizing device 14 wherein the cream is subjected to a second homogenizing action and after the cream has been so treated, it is conducted from the second homogenizing machine by a pipe 15 to a suitable cooler 16. After the cream has been cooled in the cooler it is discharged from the tank 17 of the cooler into the cans or bottles, as usual.

The apparatus shown in Fig. 1 is capable of operating continuously or without interruption and it is well adapted for use in plants which handle a considerable quantity of homogenized cream. In smaller plants, however, it is possible to use a single homogenizing machine in which the cream is subjected to a repeated homogenizing action or, in other words, the cream is passed a plurality of times through this same homogenizing machine. In this form of apparatus, a tank 18 may be used which is similar to the tank 1 in Fig. 1. This tank 18 is provided with one inlet pipe 19 which leads from an ordinary storage tank 21, the latter being preferably placed at a higher elevation than the tank 18 in order to provide a gravity feed from the tank 21 into the tank 18. The pipe 19 between these two tanks is provided with a suitable valve 22 for controlling the flow of cream from the tank 21 into the tank 18. The homogenizing machine 23 is connected by a pipe 24 to the outlet of the feed tank 18, this pipe 24 conducting the cream to the pumps of this homogenizing machine and the latter forces the cream into the reservoir 25 at a homogenizing pressure of, say, 250 atmospheres. The cream at this pressure is conducted from the reservoir 25 into the homogenizing device 26 of this machine and after being subjected to the initial homogenizing action, the cream enters a pipe 27. This pipe is provided with one branch 28 which leads to the storage tank 21 and with another branch 29 which leads to a suitable cooler 30. A suitable valve 31 is provided for causing the cream to flow into one or another of these branches. In operating this form of apparatus, the cream before being homogenized is introduced into the tank 18 and passes by the pipe 24 through the homogenizing machine 23 and after the cream has been initially homogenized, it passes by the pipes 27 and 28 into the tank 21, the valves 22 and 31 being closed during the first homogenizing action upon a body of cream. After all the cream in the tank 18 has been homogenized and conducted to the storage tank 21, the valves 22 and 31 are then opened and the homogenized cream in the tank 21 flows into the tank 18 and is passed a second time through the homogenizing machine and as it is discharged from the machine by the pipe 27, it passes through the branch pipe 29 and its temperature is reduced by the cooler 30. In both instances, the final homogenized product is reduced by the cooler to a temperature as near as possible to 40° F.

As I have previously stated, my present process may be applied to homogenizing machines of various forms. I have found, however, that excellent results are obtained by the use of a homogenizing machine of substantially the form shown in the accompanying drawing. To enable a clear understanding to be had of this type of homogenizing machine, the same will be described more or less in detail. Each homogenizing machine in the form shown embodies a suitable base provided with a driving shaft 32 which may be driven by a motor through the belt wheels 33 and the shaft 32 is connected by gearing 34 to a shaft 35 which has eccentrics 36 thereon corresponding in number to the number of pumps used upon the machine. Any suitable number of pumps may be used, a set of three pumps being shown in the present instance, and to insure substantial uniform pressure upon the liquid during the homogenizing operation, these eccentrics are set equidistantly with respect to the shaft. Each pump comprises a cross-head 37 having a plunger 38 which reciprocates in the cylinder 39 of the pump, a suitable stuffing-box 40 being provided to prevent escape of the liquid around the plunger. The casing of each pump is provided with an inlet valve 41 which receives the liquid and a discharge valve 42 which prevents back-flow of liquid into the pump cylinder. These two valves have a very limited movement in order that they may operate satisfactorily under the very high pressure, the upper valve 42 being controlled by a depending stem 43. The outlet passage 44 of each pump leads to a chamber 45 formed in the reservoir, this reservoir being bolted to the several pumps, and the homogenizing device for each machine is bolted or otherwise attached to the reservoir and has an inlet passage 46 which communicates with the chamber 45 of the reservoir. The casing of the homogenizing device in the present instance is provided with a bore 47 which is preferably cylindrical, and the passage 46 leads thereto preferably at a perpendicular, this passage 46 communicating with the pump.

A shoulder is formed toward the outlet end of the bore 47 preferably by a removable or separately formed bushing 48, the latter being threaded or otherwise tightly fitted into the casing, and it also has a head or flange 49 which bears upon a packing ring 50 so as to form a perfectly fluid-tight fit upon the casing. This bushing has a bore 51 through which the emulsified or homogenized liquid may discharge from the casing, and the delivery pipe or other means may be attached to the bushing 48 to conduct the emulsified liquid to the desired point.

The emulsifying or homogenizing action is produced within the casing by a set of assembled or superposed elements which are held positively in intimate relation under heavy compression and have relatively minute passages or ducts through which numerous streams of the liquid are directed at high velocity and are caused to impinge upon suitable surfaces that will cause destruction of the fat globules. I preferably employ a set of disks 52 which are duplicates and are mounted or arranged in superposed relation within the bore 47 of the casing. Each disk is flat and its opposed surfaces are ground or formed perfectly true so that when the disks are assembled, they will fit precisely against one another. The periphery of each disk is provided with a suitable number of bosses or lugs 53 which are adapted to rest against the wall of the bore 47 of the casing and thereby center the disks therein and at the same time form a number of segmental circumferentially spaced passages 54 between the set of disks and the wall of the bore. The disks are placed at that point in the bore where the passage 46 communicates therewith, and in order to permit the body of liquid flowing from the high pressure pump through the passage 46 to reach all of these segmental passages 54, the faces of the bosses or lugs 53 are reduced or tapered as at 55 whereby means of communication between these circumferentially spaced passages will be established. The center of each disk is formed with an aperture 56 so that when the disks are assembled, a passageway will be formed through the disks which communicates with the outlet passage or bore 51 in the bushing 48.

The liquid in passing from the circumferential passages 54 to the central passage formed by the apertures 56 in the disk is divided into numerous relatively minute streams which travel at a relatively high velocity and such streams are directed against surfaces which are so arranged as to cause the destruction of the fat globules. In the present instance, the dividing of the body of the liquid into the minute streams is effected by forming minute passages or ducts between the adjacent disks. These ducts may be conveniently formed by grooving one or both faces of each disk. I generally prefer to groove both faces of each disk in order to insure to the greatest degree a thoroughness in the operation and, moreover, the apparatus has a greater capacity in that case. In the present instance, I provide the faces of each disk with an annular or circumferential groove 57 which is preferably concentric with the axis of the disk, and two sets of inwardly extending grooves 58 and 59, the grooves 58 extending from the periphery of the disk to and communicating with the circumferential groove 57, while the inner set of grooves 59 lead from the circumferential groove 57 to the aperture 56 in the center of the disk. These two sets of grooves 58 and 59 are preferably arranged in radial relation and they are also staggered with respect to one another, the radial relation of the grooves 58 and 59 to the circumferential groove 57 causing the liquid to be projected into the circumferential groove 57 at a normal, and the staggered or alternating relation of the grooves 58 and 59 will cause the liquid to be projected abruptly against the wall of the groove 57, whereupon it must be diverted in its course to approximately a right angle and must be again diverted in its course to approximately a right angle before entering the inner set of grooves 59. The liquid upon reaching the passageway formed by the central apertures 56 of the disks may then reach the outlet passage or bore 51 and thus flow from the apparatus.

The set of disks are held in close and positive contact with one another under high compression so as to prevent the liquid from following any other course than through the passages provided for the liquid, and any suitable means may be provided for producing and maintaining such compression. In the present instance, I provide a plunger 60 the lower end of which rests firmly upon the top of the set of disks and a compression screw 61 bears upon a seat formed upon the top or outer end of the plunger, this compression screw being fitted into a yoke or other suitable support 62 attached to the casing, and a packing is provided for the plunger which will effectively prevent the escape of the liquid under high pressure. This packing in the present instance consists of a cupped packing ring 63 which encircles the plunger 60, a gland 64 bears upon the packing ring, and a nut or cap 65 bears upon the gland 64 and is threaded or otherwise suitably attached to the casing.

In both forms of apparatus shown, the second or repeated homogenizing action upon the cream breaks up the curd that has been formed during the first homogenizing action, and I have discovered that by repeating the homogenizing action upon cream, the product can be used in hot coffee, tea, or other liquids without curdling.

I claim as my invention:—

1. The improvement in the art of homogenizing cream which consists in subjecting the cream to repeated homogenizing action to avoid the occurrence of curd in the final homogenized product.

2. The hereindescribed process which consists in subjecting cream to a homogenizing action, and then subjecting the cream homogenized in the first action to a second homogenizing action to break up the curd formed during the first homogenizing action.

3. The hereindescribed process which consists in heating cream to a suitable temperature, subjecting the heated cream to a homogenizing action, repeating such homogenizing action upon the cream, and then cooling the cream.

In testimony whereof I have hereunto set my hand in presence of two subscribing witnesses.

JOSEPH WILLMANN.

Witnesses:
 HOWARD B. PECK,
 CHAS. H. HALL.